Sept. 7, 1965
C. R. SCHUDEL
3,205,109
METHOD OF MAKING A HONEYCOMB TYPE STRUCTURE
Filed Jan. 7, 1963
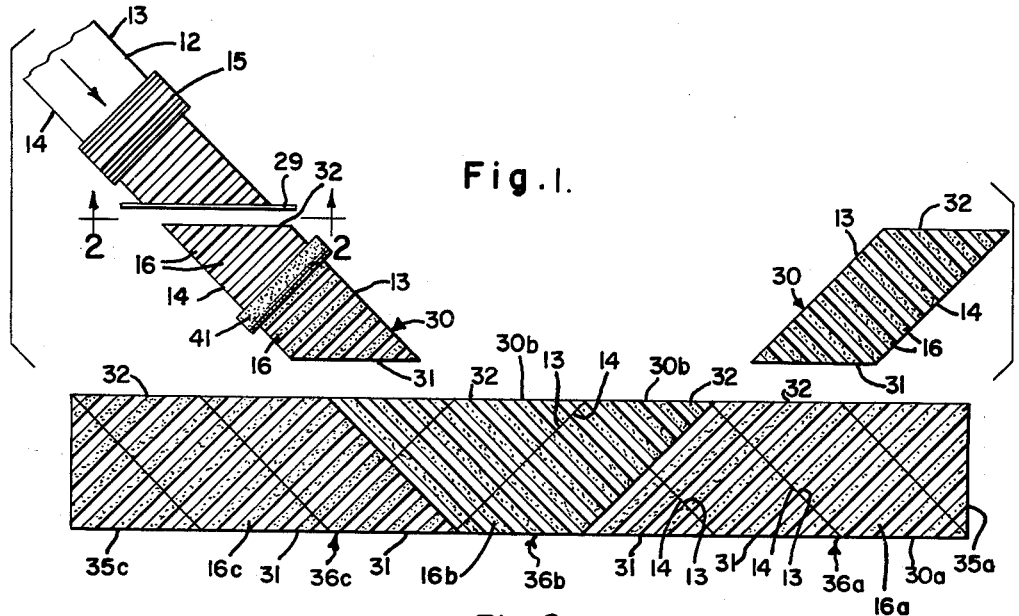
Fig. 1.
Fig. 2.
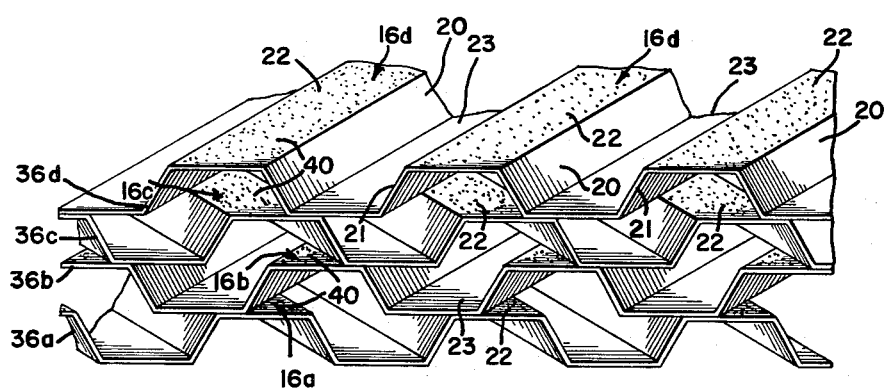
Fig. 3.
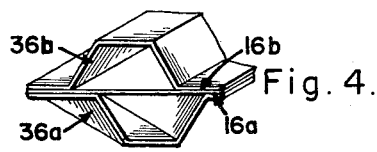
Fig. 4.
INVENTOR.
Conrad R. Schudel
BY
Townsend and Townsend
attorneys

United States Patent Office 3,205,109
Patented Sept. 7, 1965

3,205,109
METHOD OF MAKING A HONEYCOMB
TYPE STRUCTURE
Conrad Richard Schudel, Hurst, Tex., assignor to Hexcel Products Inc., Berkeley, Calif.
Filed Jan. 7, 1963, Ser. No. 249,937
5 Claims. (Cl. 156—197)

This invention relates to a method for making a corrugated core having multi-directional strength.

Generally speaking, more conventional honeycomb such as the type generally disclosed in U.S. Patents Nos. 2,527,752, 2,610,934, or 2,734,843, for example, exhibits substantially greater rigidity in its ribbon direction (technically referred to as the "L" dimension) than in its transverse direction ("W" dimension). In special applications, such as providing a reinforcing core for helicopter rotor blades, for example, it is desirable to make a honeycomb structure with alternate corrugated ribbons defining the cell openings of the structure obliquely angular disposed relative to each other and with all cell walls extending at an oblique angle to the plane of the face skins of the sandwich which the honeycomb core reinforces. In the particular embodiment of the invention shown in the drawings, alternate corrugated ribbons are displaced at 90° to one another, and the cell walls of the corrugated ribbons are disposed at 45° to the plane of the face skins. It is appreciated that these angles may be varied according to particular directional strength properties desired in any given instance. It has been found that a honeycomb core sandwich structure of this latter type exhibits more uniform multi-directional strength properties than more conventional honeycomb sandwich structures in which all the cell walls extend parallel to one another and usually perpendicular to the face skins of the structure.

An object of the present invention is to provide a novel method of manufacturing cores having multi-directional strength properties of the type above referred to. One advantage of the method is that it involves a minimum of waste material that must be trimmed off during the manufacturing process as compared to other processes with which I am familiar.

Another object and advantage is that the method may be practiced by conventional sheet metal corrugating equipment which can be operated to readily corrugate lengths of flat web or sheet material in a direction transverse to that direction in which the web is moved. Contrary to what might be expected, the present method does not require that the corrugations be made in the web material at a 45° angle or at any oblique angle relative to the longitudinal axis of the moving web, but, as above stated, all corrugations are made in a direction transverse or exactly perpendicular to the direction of movement of the web through the corrugating rollers.

More specifically, an object of this invention is to provide a method for making a laminated cellular core having multi-directional rigidity by corrugating an elongated strip of material such as sheet metal or metal foil with alternating projections and depressions having cross-sections in the form of truncated triangles, each projection and recession being aligned at a right angle to the elongated edge of the strip. The ends of each strip are trimmed at an angle to both the strip edges and the axes of the projections and depressions, creating a segment which is generally a non-rectangular parallelogram. By aligning these segments in a long strip and using the trim pieces to square off the ends, a rectangular strip having corrugations angled to the edge may be formed. A second strip composed in the same manner but having the corrugations oriented to traverse the corrugations of the first strip may be superimposed on top of the lower strip to create a laminated structure. Other strips may be superimposed on top of these strips and all be bonded together at the intersections of the corrugations creating a honeycomb type core of any desired thickness and shape.

Other objects and advantages will appear from the following description of two embodiments of the invention and the novel features will be particularly pointed out hereinafter in connection with the appended claims.

In the accompanying drawings:

FIG. 1 is a schematic representation of a means by which the process may be carried out;

FIG. 2 is a top view of the fabricated cellular core structure.

FIG. 3 is a perspective view of the broken away portion of the laminated honeycomb structure.

FIG. 4 is a fragmentary perspective view of a modified type of honeycomb.

In manufacturing the laminated cellular core, a continuous strip of ductile material 12, such as heavy gauge aluminum foil, is formed and cut into proper shape for fabrication. This material should be strong enough to withstand mechanical stresses yet be flexible and ductile enough that bending occurs without shearing when forced beyond its elastic limits. The outer edges 13 and 14 of strip 12 are parallel to one another throughout its whole length and the strip can be unrolled from any suitable storage configuration such as a coil.

Strip 12 can be passed through a conventional metal working die 15. As strip 12 is fed in the direction of the arrow the die continuously deforms the strip surface into an even patterned series of corrugations 16. Each corrugation 16 is parallel to the others and projects at a right angle from both strip edges 13 and 14.

The corrugations are shaped to give structural strength and stiffness properties to the ribbon 12. Each corrugated projection 16 is in the form of a truncated triangle having slanting sidewalls or legs 20 and 21. An upper flat web 22 extends between the upper edge of each sidewall 20 and 21 and a lower flat web 23 extends between the lower edges of adjacent projections 16. Since all projections 16 are of identical size and shape, the corrugation pattern is even and only provides strength and stiffness properties in the direction of the axes of the projections 16.

The corrugated portion of strip 12 is divided into small identical parallelogram sections 30 after being fed from the die 15. A first oblique cut 31 is made at the leading edge of strip 12 by shear cutter 29. As strip 12 advances cutter 29 makes a second oblique cut 32 at a predetermined distance from first cut 31. Both cuts are parallel to one another and intersect longitudinal strip edges 13 and 14 at a 45° angle. In extending between strip edges 13 and 14, oblique cuts 31 and 32 intersect, at a 45° angle, those projections 16 at each end of the parallelogram sections 30.

A layer 36a of corrugated material is fabricated from a plurality of parallelogram segments 30a. By positioning the parallelogram segments so that strip side edges 13 and 14 of each individual segment 30a are in abutting relationship with strip side edges 14 and 13 respectively of other identical segments 30a, all of projections 16a in the segments are oriented in the same direction. The oblique cut ends 31 and 32 of all abutting parallelogram segments are aligned with one another to provide a linear edge. By filling the triangular portion at each end of layer 36a with a triangular cut corrugated segment 35a squared off corners are provided. As a result of this segmental fabrication, a generally rectangular layer 36a of corrugated material is fabricated.

An adhesive material 40 can be applied to the flat upper web 22 of each corrugation projection 16. Application of this material can be performed either during the cutting operation or may be done after the parallelogram segments are positioned side by side. If adhesive application is done during the cutting operation, an applicator such as roller 41 may be used.

Additional layers of corrugated material can be laminated upon lower layers. All the parallelogram segments 30b which are to be used in the second layer are first flipped over. This changes the orientation of projections 16b on segments 30b with relation to the orientation of projections 16a in lower layer 36a. These segments 30b can thereafter be fabricated into layer 36b in the same manner as generally described for layer 36a. The only difference between each layer is the orientation of projections 16; now they diagonally cross the other projections located in adjacent layers at right angles.

In fabricating a composite structure illustrated in FIGS. 2 and 3, laminated layers 36a and 36b are first bonded together. As each segment 30b of upper layer 36b is superposed over lower layer segments 30a, the flat lower web surfaces 23 cross and contact upper flat webs 22 of the adjacent layer. Adhesive 40 then bonds the layers together and holds the oblique cut ends 31 and 32 in alignment. It should be understood that bonding processes such as welding can be used instead of adhesive material 40.

As illustrated in FIG. 3, additional layers of corrugated material can be superimposed upon the other layers. The first layer 36a has projections 16a oriented in one direction; layer 36b has projections 16b oriented at a right angle to projections 16a; layer 36c has projections 16c oriented at a right angle to lower adjacent projection 16; and layer 36d has projections 16d oriented at a right angle to lower adjacent projection 16c. Adhesive material 40 bonds each layer to upper and lower adjacent layers at the contacting webs 22 and 23 to provide a laminated structure.

It should be noted that the odd numbered alternate layers 36a and 36c have projections 16 oriented in the same relative direction. The even numbered alternate layers 36b and 36d positioned between these layers, have projections 16 oriented at right angles to the projections of both the adjacent upper and lower odd numbered layer projections 16. Since the crossed projections 16 of each layer exhibit strength and rigidity properties in the direction of the axes of projections 16, crossing the projections of alternate layers 36a, 36b, 36c and 36d crosses the direction of strength properties thereby providing two dimensional strength properties. As additional layers are superimposed upon one another a third dimension of strength property which is perpendicular to the axes of the crossed projections is provided. As a result, a structure is fabricated which can withstand forces exerted from different directions.

As illustrated in FIG. 4, a flat sheet or foil of metal or other material can be sandwiched between adjacent layers 36a and 36b. The flat webs 16a and 16b are bonded directly to the foil by any conventional process. This arrangement would have the effect of changing the strength properties of the structure.

About the only limit on the number of layers that can be laminated is in the desired size and shape of the finished structure. When the desired dimensions are attained, an outer face skin can be bonded to the flat web portions or the aligned cut edges to create an enclosed structure or sandwich.

It will be understood that various changes in the sizes, shapes, details, angles, and arrangements and combinations of parts which have been herein described and illustrated in order to explain the nature of the invention may be made by those skilled in the art within the principle of the invention as expressed in the appended claims.

In the claims:

1. A method for making a laminated honeycomb structure comprising the steps of: corrugating at least one elongate strip of sheet material; cutting the strip into sections along parallel cut lines disposed at an angle relative to the longitudinal axes of the strip to form a plurality of identically corrugated parallelograms; positioning the cut sections in adjacent side edge abutting and end aligned relationship to form a first layer; superimposing a second layer of side edge abutting and end aligned cut sections on said first layer; aligning the axes of the corrugations in the second layer diagonally to the corrugations in the first layer and with each parallelogram in the second layer overlying portions of at least two parallelograms in the first layer; and bonding said superimposed layers of sections together at their contacting corrugated surfaces to form an integral laminated structure.

2. A method for making a laminated multi-axial cellular core having multi-directional rigidity, comprising the steps of: corrugating an elongated strip of foil to have continuous alternating projections and depressions axially aligned at right angles to the strip longitudinal edge, each projection and depression having a truncated triangular cross-sectional shape including flat leg portions and a flat web portion; cutting the strip at a plurality of equally spaced parallel cut lines at an oblique angle relative to the longitudinal edges of the strip and the axes of the corrugations, to form a plurality of identical parallelogram segments; positioning the parallelogram segments in longitudinal edge abutting, cut end aligned relationship to form a first layer; superimposing a second layer of parallelogram segments in side edge abutting, cut-end aligned relationship upon the lower layer with said corrugations of the segments of the second layer diagonal to the first layer corrugations, and with each segment in the second layer overlying portions of at least two segments in the first layer; and bonding the layers together at the intersecting surfaces of the transverse corrugations.

3. A method for making a multi-cellular core having multi-directional rigidity comprising the steps of: corrugating a strip of metal foil along its entire length with alternate concave and convex, flat topped projections and depressions axially aligned at right angles to the strip longitudinal edge; cutting the strip along parallel oblique angle cut lines diagonal to both the longitudinal edges of the strip and axes of the corrugations to form a plurality of corrugated parallelogram segments; aligning the cut parallelogram segments in longitudinal side edge abutting and cut-end aligned relationship to form a first layer; superimposing a second layer of a plurality of longitudinal side edge and cut-end aligned parallelogram segments on the first layer with the corrugations of the segments of the second layer aligned in diagonal right angle relationship to the corrugation of the first layer and with each segment in the second layer overlying portions of at least two segments in the first layer; and bonding the first and second layers together at their intersecting surfaces.

4. A method for making a laminated multi-cellular core having multi-directional rigidity comprising the steps of: corrugating a strip of material with parallel projections and depressions axially aligned at right angles to the longitudinal edge, each projection and depression having a cross-section in the shape of a truncated triangle, the legs of each triangle forming a common wall between adjacent depressions and projections, the truncated webs forming flat web surfaces which are planar to one another; cutting the strip at an oblique angle to the longitudinal edges and to the axes of the corrugations along equally spaced lines forming a plurality of equal sized parallelograms; applying a bonding material to the flat truncated web surfaces; positioning the parallelograms in a longitudinal edge adjacent, cut-end aligned relationship to form a rectangular first layer of parallelograms having corrugations oriented at an oblique angle to the longitudinal edges of said first layer; superimposing a second layer of parallelograms upon the top of the first layer with the corrugations of the segments of the second layer diagonally oriented at right angles to the corrugations of the first layer and with each parallelogram in the second layer overlying portions of at least two segments in the first layer; and bonding the layers together at the points of intersection of the flat web surfaces of the corrugations.

5. The method of claim 1 in which the bonding step includes sandwiching a sheet of material between each adjacent layer, and bonding the contacting corrugated surfaces to the sheet of material.

References Cited by the Examiner
UNITED STATES PATENTS

| | | | |
|---|---|---|---|
| 1,625,061 | 4/27 | Trout | 189—34 |
| 1,931,365 | 10/33 | Watson | 156—591 |
| 3,037,592 | 6/62 | Shipley et al. | 189—34 |
| 3,044,921 | 7/62 | Wentworth et al. | 156—205 |
| 3,096,053 | 7/63 | Pajak | 156—207 |

EARL M. BERGERT, *Primary Examiner.*